(12) United States Patent
Tseng et al.

(10) Patent No.: US 9,978,318 B2
(45) Date of Patent: May 22, 2018

(54) ELECTRONIC PAPER DISPLAY DEVICE AND MANUFACTURING METHOD THEREOF

(71) Applicant: E Ink Holdings Inc., Hsinchu (TW)

(72) Inventors: Yao-Te Tseng, Hsinchu (TW);
Wen-Jung Lee, Hsinchu (TW);
Jia-Hung Chen, Hsinchu (TW);
Shu-Fen Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days. days.

(21) Appl. No.: 15/059,288

(22) Filed: Mar. 2, 2016

(65) Prior Publication Data
US 2016/0322002 A1 Nov. 3, 2016

(30) Foreign Application Priority Data

Apr. 29, 2015 (TW) .............................. 104113722 A

(51) Int. Cl.
*G02F 1/167* (2006.01)
*G09G 3/34* (2006.01)
(Continued)

(52) U.S. Cl.
CPC ............. *G09G 3/344* (2013.01); *B23K 26/21* (2015.10); *G02B 26/026* (2013.01); *G02F 1/167* (2013.01);
(Continued)

(58) Field of Classification Search
CPC ............ G09G 3/34; G09G 3/006; G09G 3/20; G09G 3/344; G09G 2300/0426;
(Continued)

(56) References Cited

U.S. PATENT DOCUMENTS 7,394,508 B2 7/2008 Chen et al.
7,995,184 B2 8/2011 Kim et al.
(Continued)

FOREIGN PATENT DOCUMENTS

CN 202693964 U 1/2013
CN 103278987 A 9/2013
(Continued)

OTHER PUBLICATIONS

Corresponding Taiwanese Office Action that these art references were dated Mar. 2, 2017.

*Primary Examiner* — Richard Hong
(74) *Attorney, Agent, or Firm* — CKC & Partners Co., Ltd.

(57) ABSTRACT

An electronic paper display device includes a display region, a signal-sending region, data lines, scan lines, selection-line regions, and a repair line. The signal-sending region is located at a side of the display region. The scan lines intersect the data lines to divide the display region into pixel regions. Each of the selection-line regions is located at a side of one of the scan lines. Disposed on two sides of each of the scan lines are respectively one of the pixel regions and one of the selection-line regions. Each of the selection-line regions has selection lines. The selection lines intersect the data lines. The repair line is between the signal-sending region and the display region. The repair line intersects the selection lines. The repair line and the data lines are selectively electrically connected to one of the selection lines.

15 Claims, 4 Drawing Sheets

(51) Int. Cl.
  *G02B 26/02* (2006.01)
  *B23K 26/21* (2014.01)
(52) U.S. Cl.
  CPC ........... *G09G 2300/0426* (2013.01); *G09G 2310/0267* (2013.01); *G09G 2330/04* (2013.01); *G09G 2330/08* (2013.01)
(58) Field of Classification Search
  CPC ....... G09G 2310/0267; G09G 2330/04; G09G 2330/08; B23K 26/21; G02B 26/026; G02F 1/167; G02F 1/136259; G06F 3/0412
  See application file for complete search history.

(56) References Cited

U.S. PATENT DOCUMENTS

| | | |
|---|---|---|
| 8,026,993 B2 | 9/2011 | Liao |
| 8,077,270 B2 | 12/2011 | Peng et al. |
| 8,179,495 B2 | 5/2012 | Hsu et al. |
| 8,264,632 B2 | 9/2012 | Lee et al. |
| 8,411,221 B2 | 4/2013 | Liu |
| 8,610,840 B2 | 12/2013 | Kwon |
| 8,766,957 B2 | 7/2014 | Liu |
| 2006/0103410 A1* | 5/2006 | Jeon .................. G09G 3/006 324/760.02 |
| 2007/0035491 A1* | 2/2007 | Chen .................. G09G 3/006 345/87 |
| 2009/0033823 A1* | 2/2009 | Chung ............ G02F 1/136259 349/54 |
| 2012/0147311 A1* | 6/2012 | Chen ............ G02F 1/136259 349/139 |
| 2012/0319557 A1 | 12/2012 | Kretz et al. |
| 2014/0292827 A1* | 10/2014 | Kang .................. G09G 3/20 345/690 |
| 2015/0185932 A1* | 7/2015 | Lu .................. G06F 3/0412 345/173 |
| 2015/0309379 A1* | 10/2015 | Yao ............ G02F 1/136259 257/72 |
| 2015/0379908 A1* | 12/2015 | Kim .................. G09G 3/006 345/84 |

FOREIGN PATENT DOCUMENTS

| | | |
|---|---|---|
| CN | 203324619 U | 12/2013 |
| CN | 203644782 U | 6/2014 |

* cited by examiner

ELECTRONIC PAPER DISPLAY DEVICE AND MANUFACTURING METHOD THEREOF

RELATED APPLICATIONS

This application claims priority to Taiwanese Application Serial Number 104113722, filed Apr. 29, 2015, which is herein incorporated by reference.

BACKGROUND

Field of Invention

The present invention relates to an electronic paper display device and a manufacturing method of the electronic paper display device.

Description of Related Art

In today's market full of a wide variety of consumer electronic products, electronic paper display devices have been utilized as display screens in small-sized billboards. An electronic ink (e-ink) layer of an electronic paper display device includes the main elements of an electrophoresis buffer and white and black charged particles doped in the electrophoresis buffer. The white and black charged particles are driven to be displaced by applying a voltage to the e-ink layer, so that each individual pixel displays a black, white or gray level. The electronic paper display device utilizes incident light (sunlight or indoor ambient light) that irradiates the e-ink layer to realize display. Therefore, the electronic paper display device needs no backlight, which reduces the power consumption of the electronic paper display device.

When an array process is performed on a small-sized electronic paper display device, line damage caused by static electricity in the panel of the electronic paper display device does not easily occur. Hence, the yield of the small-sized electronic paper display device is easily maintained. However, when an array process is performed on a large-sized electronic paper display device, line damage caused by static electricity in the panel of the electronic paper display device does easily occur, resulting in some pixel regions not being able to perform display. The cost of large-sized electronic paper display devices is high, and so repair to the line damage in the display region of the large-sized electronic paper display device may be attempted. When this is not possible, the yield of the electronic paper display device is reduced, and a product with a large area must be scrapped.

SUMMARY

An aspect of the present invention is to provide an electronic paper display device.

According to an embodiment of the present invention, an electronic paper display device includes a display region, a signal-sending region, a plurality of data lines, a plurality of scan lines, a plurality of selection-line regions, and a repair line. The signal-sending region is located at a side of the display region. The scan lines intersect the data lines to divide the display region into plural pixel regions. Each of the selection-line regions is located at a side of one of the scan lines. Disposed on two sides of each of the scan lines are respectively one of the pixel regions and one of the selection-line regions. Each of the selection-line regions has plural selection lines, and the selection lines intersect the data lines. The repair line is between the signal-sending region and the display region. The repair line intersects the selection lines, and the repair line and the data lines are selectively electrically connected to one of the selection lines of at least one of the selection-line regions.

In one embodiment of the present invention, an intersection position of the repair line and one of the selection lines of at least one of the selection-line regions has a welding point.

In one embodiment of the present invention, an intersection position of one of the data lines and one of the selection lines of at least one of the selection-line regions has a welding point.

In one embodiment of the present invention, at intersection positions of the repair line and the selection lines, the repair line is located above the selection lines.

In one embodiment of the present invention, at intersection positions of the data lines and the selection lines, the data lines are located above the selection lines.

In one embodiment of the present invention, the data lines are parallel to the repair line.

In one embodiment of the present invention, the scan lines are perpendicular to the data lines.

In one embodiment of the present invention, the scan lines, the selection-line regions, and the data lines surround the pixel regions.

In one embodiment of the present invention, one of the selection lines of each of the selection-line regions is a grounding line.

In one embodiment of the present invention, the repair line has a common voltage.

In one embodiment of the present invention, the scan lines are gate lines.

In one embodiment of the present invention, the data lines and the repair line are metal lines in the same layer.

In the aforementioned embodiments of the present invention, the selection line of the selection-line region intersects the data line, and the repair line intersects the selection line. Hence, an intersection position may be formed by the selection line and the data line, and another intersection position may be formed by the repair line and the selection line. As a result of such a design, the data line and the selection line may be electrically connected by welding the intersection position thereof. Moreover, the repair line and the selection line may also be electrically connected by welding the intersection position thereof. When a data line is damaged by static electricity, a row of pixel regions cannot be displayed. Users can choose a suitable selection line of the selection-line region to electrically connect the repair line and the damaged data line, such that the signal of the signal-sending region may be transmitted through the repair line and the selection line to the data line damaged by static electricity. Therefore, the present invention can effectively improve the yield of an electronic paper display device with a large size, and prevent situations in which products must be scrapped.

Another aspect of the present invention is to provide a manufacturing method of an electronic paper display device.

According to an embodiment of the present invention, a manufacturing method of an electronic paper display device includes the following steps. (a) An electronic paper display device having a display region, a signal-sending region, a plurality of data lines, and a plurality of scan lines is provided. (b) A plurality of selection-line regions are formed, and each of the selection-line regions is located at a side of one of the scan lines, such that disposed on two sides of each of the scan lines are respectively one of the selection-line regions and one of a plurality of pixel regions of the display region. (c) A repair line is formed between the signal ending region and the display region. The repair line intersects the selection lines, and the repair line and the data lines are selectively electrically connected to one of the selection lines of at least one of the selection-line regions.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
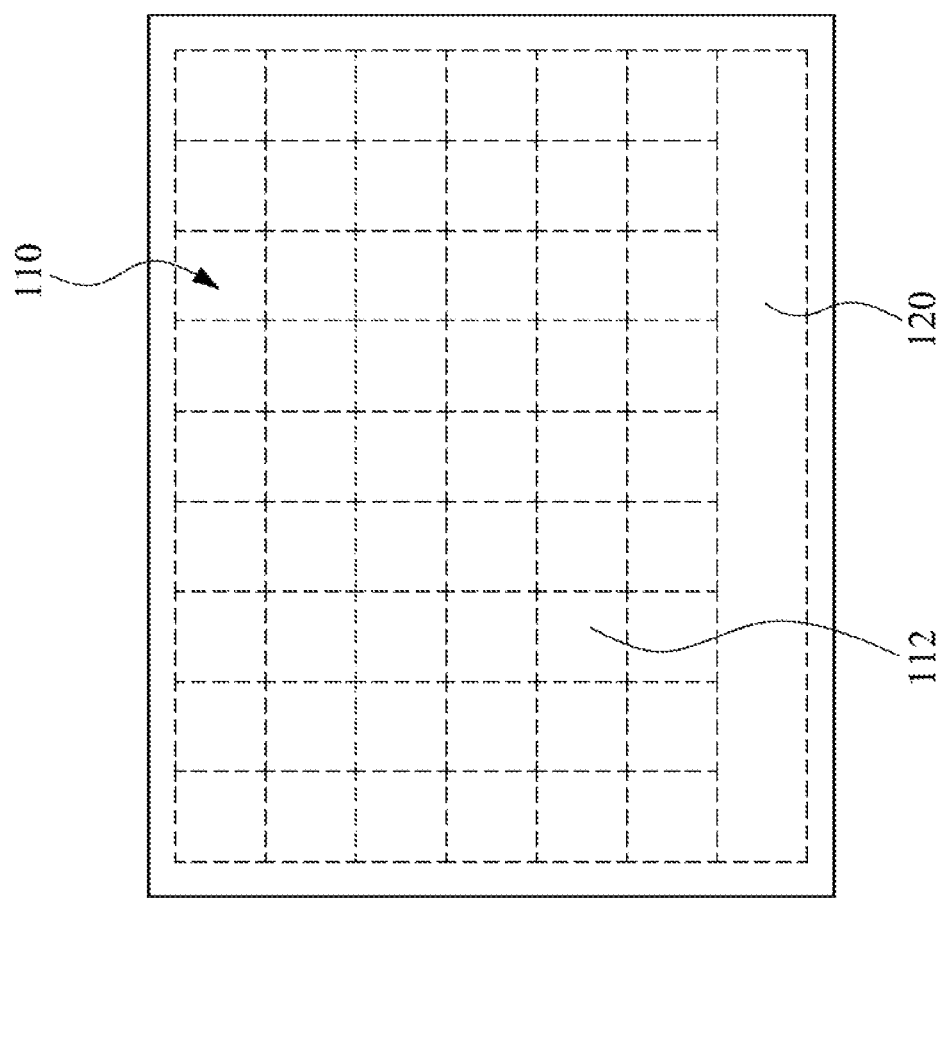
FIG. 1 is a top view of an electronic paper display device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
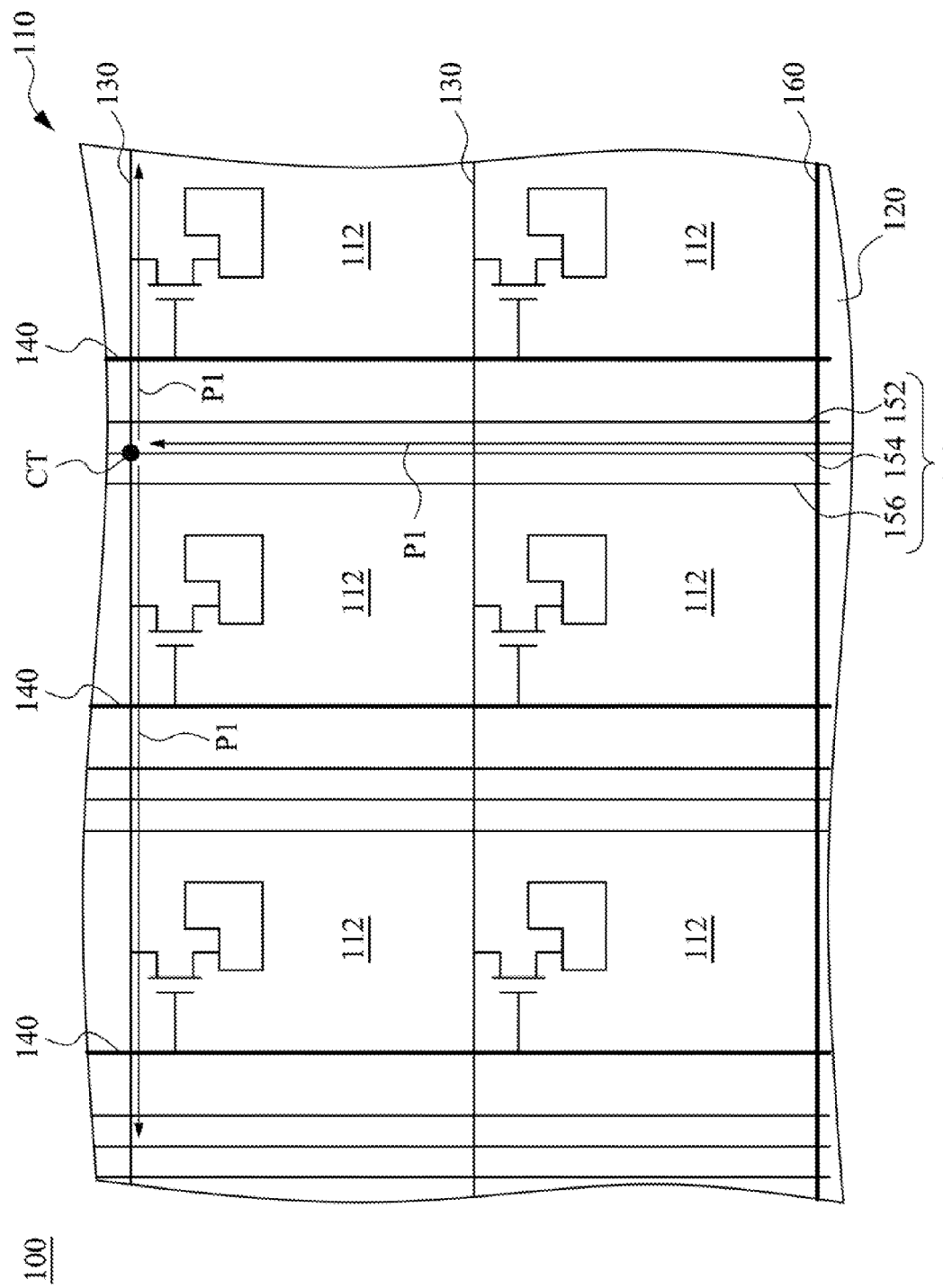
FIG. 2 is a partially enlarged view of the electronic paper display device shown in FIG. 1.

FIG. 1 is a top view of an electronic paper display device 100 according to one embodiment of the present invention. FIG. 2 is a partially enlarged view of the electronic paper display device 100 shown in FIG. 1. As shown in FIG. 1 and FIG. 2, the electronic paper display device 100 includes a display region 110, a signal-sending region 120, a plurality of data lines 130, a plurality of scan lines 140, a plurality of selection-line regions 150, and a repair line 160. The signal-sending region 120 is located at a side of the display region 110, which may be electrically connected to an integrated circuit (IC). The scan lines 140 intersect the data lines 130 to divide the display region 110 into plural pixel regions 112. For example, the scan lines 140 are substantially perpendicular to the data lines 130. It is to be noted that "substantially" used herein may refer to variances occurring due to manufacturing errors. In this embodiment, each of the data lines 130 is between two adjacent pixel regions 112, and each of the scan lines 140 is between two adjacent pixel regions 112. In addition, the scan lines 140 may be referred to as gate lines.

Each of the selection-line regions 150 is located at a side of one of the scan lines 140. In FIG. 2, the selection-line region 150 is located at the left side of one of the scan lines 140. Disposed on two sides of each of the scan lines 140 are respectively one of the pixel regions 112 and one of the selection-line regions 150. Each of the selection-line regions 150 has plural selection lines 152, 154, 156. In this embodiment, the number of the selection lines of each of the selection-line regions 150 is three, but the present invention is not limited in this regard. Moreover, the selection lines 152, 154, 156 intersect the data lines 130, such that the scan lines 140, the selection-line regions 150, and the data lines 130 can surround the pixel regions 112. For example, in FIG. 2, with respect to the upper and center pixel region 112, one of the scan lines 140 is at the left side of the pixel region 112, the selection-line region 150 is at the right side of the pixel region 112, and two data lines 130 are respectively at the upper side and the lower side of the pixel region 112.

The repair line 160 is between the signal-sending region 120 and the display region 110. The repair line 160 intersects the selection lines 152, 154, 156, and the data lines 130 are substantially parallel to the repair line 160. The repair line 160 may have a common voltage (Vcom).

The data lines 130 and the selection lines 152, 154, 156 are metal lines, but the data lines 130 are in a layer different from a layer in which the selection lines 152, 154, 156 are formed. The repair line 160 is a metal line, but the repair line 160 is in a layer different from the layer in which the selection lines 152, 154, 156 are formed. The data lines 130 and the repair line 160 are metal lines in the same layer, and can be manufactured at the same time. At intersection positions of the data lines 130 and the selection lines 152, 154, 156, the data lines 130 are located above the selection lines 152, 154, 156. At intersection positions of the repair line 160 and the selection lines 152, 154, 156, the repair line 160 is located above the selection lines 152, 154, 156. The selection line 154 is electrically connected to one of the data lines 130 through a contact CT.

In this embodiment, the selection line 152 of each of the selection-line regions 150 may be a grounding line, and the selection line 154 and/or the selection line 156 of each of the selection-line regions 150 may be used to transmit signals. For example, when the electronic paper display device 100 emits light, the integrated circuit can transmit a signal to the contact CT through the selection line 154 of the selection-line region 150 in a perpendicular direction. Thereafter, the data line 130 can receive the signal from the selection line 154 through the contact CT, and the signal is transmitted to a row of pixel regions 112 that the data line 130 passes through, such that the pixel regions 112 emit light. A signal-transmitting path P1 shown in FIG. 2 is an example. Such a circuit layout shown in FIG. 2 may be referred to as a T-wire design.

Moreover, the repair line 160 and the data lines 130 may be selectively electrically connected to one of the selection lines 152, 154, 156 of at least one of the selection-line regions 150 to form another signal-transmitting path (which will be described hereinafter).

It is to be noted that the elements described above and the connection relationships thereof will not be repeated in the following description, and only aspects related to the utilities of the repair line 160 and the selection-line region 150 in the electronic paper display device 100 will be described.

Figure 3:
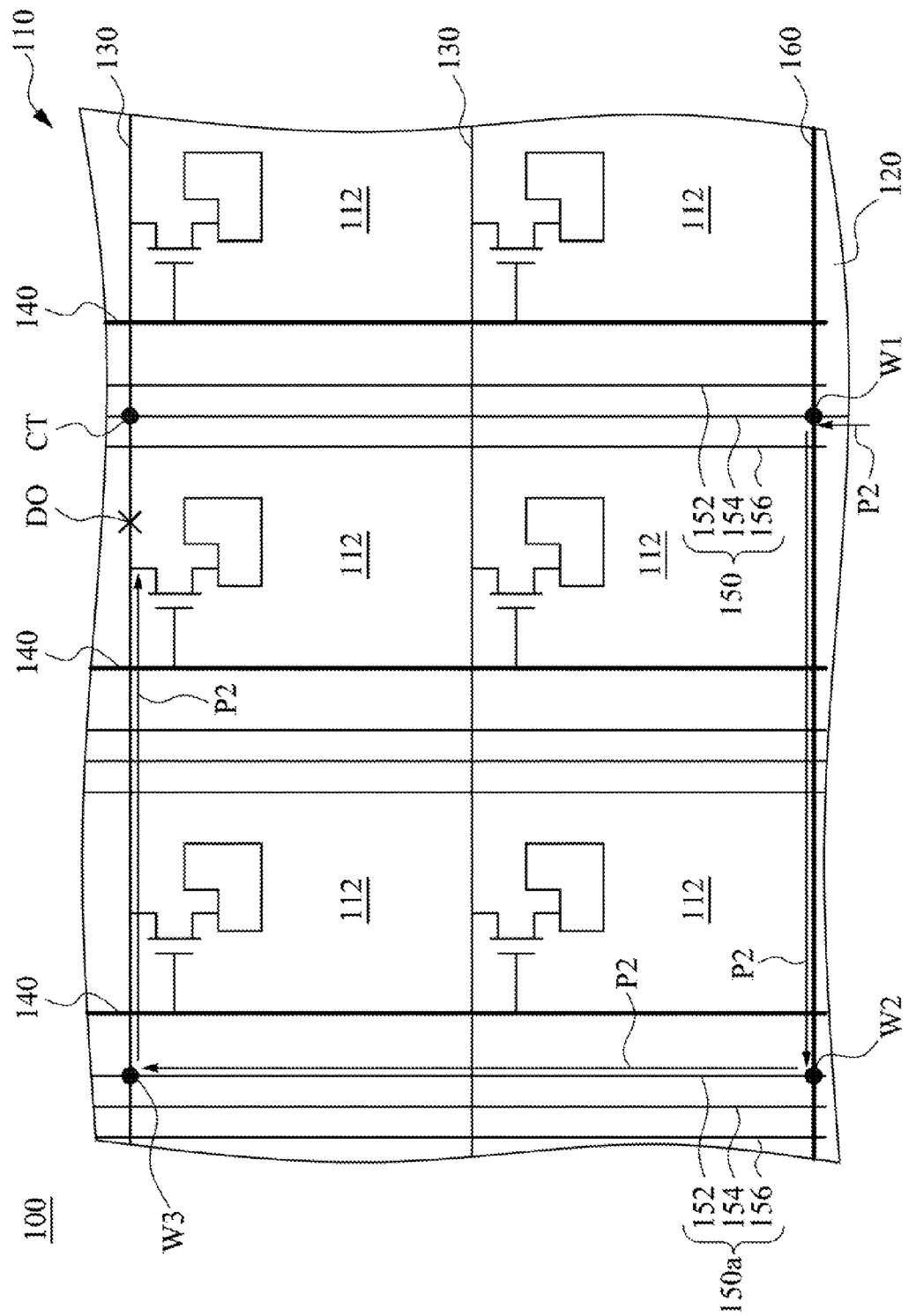
FIG. 3 is a schematic view of the electronic paper display device shown in FIG. 2, illustrating a damaged line after being repaired.

FIG. 3 is a schematic view of the electronic paper display device 100 shown in FIG. 2, illustrating a damaged line after being repaired. As shown in FIG. 2 and FIG. 3, when the integrated circuit transmits a signal to the contact CT through the selection line 154 of the selection-line region 150 in a perpendicular direction, the selection line 154 can transmit the signal to the data line 130. Thereafter, the data line 130 can transmit the signal to a row of pixel regions 112 that the data line 130 passes through, as shown in the signal-transmitting path P1 of FIG. 2. However, if the data line 130 is damaged by static electricity to form a data open DO, the portion of the data line 130 at the left side of the data open DO will not transmit the signal in a normal manner, such that the pixel regions 112 passed through by the portion of the data line 130 that is at the left side of the data open DO cannot be displayed.

In this embodiment, designers can electrically connect the repair line 160 and the selection line 154 of the selection-line region 150. For example, a welding point W1 is formed at the intersection position of the repair line 160 and the selection line 154 of the selection-line region 150. Similarly, designers can electrically connect the repair line 160 and the selection line 152 of the selection-line region 150a. For example, a welding point W2 is formed at the intersection position of the repair line 160 and the selection line 152 of the selection-line region 150a. The selection line 152 of the selection-line region 150a may be a grounding line, but is not limited in this regard. Furthermore, designers can electrically connect the data line 130 and the selection line 152 of the selection-line region 150a. For example, a welding point W3 is formed at the intersection position of the data line 130 and the selection line 152 of the selection-line region 150a. After the welding points W1, W2, W3 shown in FIG. 3 are formed, a new signal-transmitting path P2 may be created. In this embodiment, the welding points W1 W2, W3 may be formed by a laser process, but the present invention is not limited in this regard.

In the lines of FIG. 3, when the integrated circuit transmits a signal to the welding point W1 through the selection line 154 of the selection-line region 150 in a perpendicular direction, the selection line 154 of the selection-line region 150 can transmit the signal to the repair line 160 through the welding point W1. Thereafter, the repair line 160 transmits the signal to the welding point W2 in a horizontal direction. Afterwards, the repair line 160 can transmit the signal to the selection line 152 of the selection-line region 150a through the welding point W2, such that the selection line 152 of the selection-line region 150a can transmit the signal to the welding point W3 in a perpendicular direction.

As a result, the data line 130 with the data open DO can receive the signal from the selection line 152 of the selection-line region 150a through the welding point W3, and the signal is transmitted to the data line 130 at the left side of the data open DO in a horizontal direction. By utilizing the new signal-transmitting path P2, the data line 130 at the left side of the data open DO may receive the signal through the welding points W1, W2, W3, and the pixel regions 112 that cannot be displayed in an original state (i.e., a state before forming the welding points W1, W2, W3) may be displayed in a normal manner. The costs associated with the repair line 160 and the welding points W1, W2, W3 are low, and the arrangement of the lines in the present invention may be utilized to repair the pixel regions 112, thereby preventing the electronic paper display device 100 from having to be scrapped, which can be a significant waste particularly when the electronic paper display device 100 is a large-sized apparatus. Hence, the electronic paper display device 100 of the present invention is helpful to designers and manufacturers.

Figure 4:
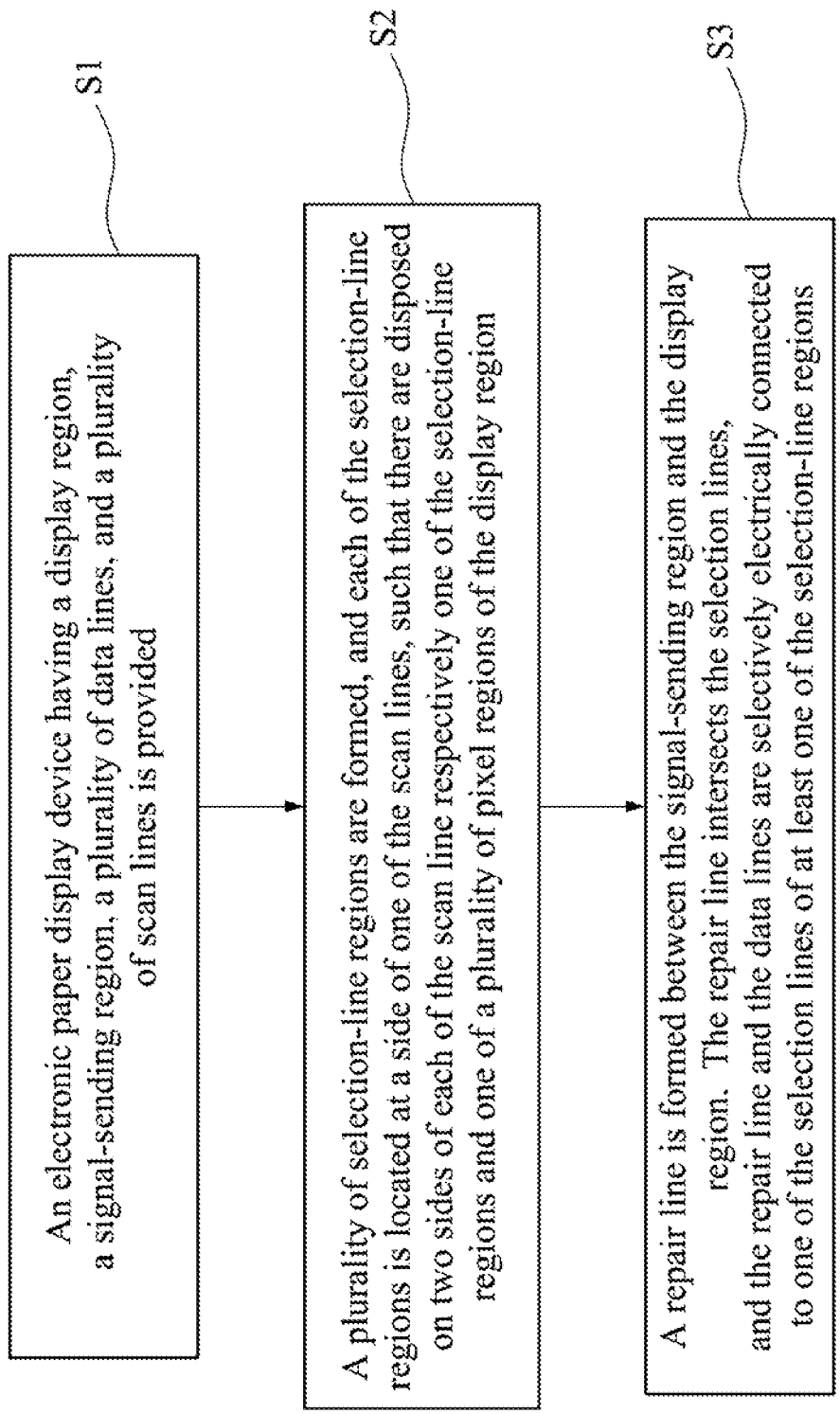
FIG. 4 is a flow chart of a manufacturing method of an electronic paper display device according to one embodiment of the present invention.

FIG. 4 is a flow chart of a manufacturing method of an electronic paper display device according to one embodiment of the present invention. In step S1, an electronic paper display device having a display region, a signal-sending region, a plurality of data lines, and a plurality of scan lines is provided. Thereafter in step S2, a plurality of selection-line regions are formed, and each of the selection-line regions is located at a side of one of the scan lines, such that there are disposed on two sides of each of the scan lines respectively one of the selection-line regions and one of a plurality of pixel regions of the display region. Finally in step S3, a repair line is formed between the signal-sending region and the display region. The repair line intersects the selection lines, and the repair line and the data lines are selectively electrically connected to one of the selection lines of at least one of the selection-line regions.

In step S3, a welding point may be formed at an intersection position of the repair line and one of the selection lines of at least one of the selection-line regions, such that the repair line can be electrically connected to the selection line. Moreover, a welding point may be formed at an intersection position of one of the data lines and one of the selection lines of at least one of the selection-line regions, such that the data line can be electrically connected to the selection line. A laser process may be performed at the intersection position of the repair line and the selection line and at the intersection position of the data line and the selection line, thereby respectively forming the welding point of the repair line and the selection line and the welding point of the data line and the selection line.

Comparing the electronic paper display device of this disclosure and the prior art, since the selection line of the selection-line region intersects the data line and the repair line intersects the selection line, an intersection position may be formed by the selection line and the data line and another intersection position may be formed by the repair line and the selection line. As a result of such a design, the data line and the selection line may be electrically connected by welding the intersection position thereof. Moreover, the repair line and the selection line may also be electrically connected by welding the intersection position thereof. When a data line is damaged by static electricity, a row of pixel regions cannot be displayed. Users can choose a suitable selection line of the selection-line region to electrically connect the repair line and the damaged data line, such that the signal of the signal-sending region may be transmitted through the repair line and the selection line to the data line damaged by static electricity. Therefore, the present invention can effectively improve the yield of an electronic paper display device with a large size, and prevent situations in which products must be scrapped.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:
1. An electronic paper display device, comprising:
a display region;
a signal-sending region located at a side of the display region;
a plurality of data lines;
a plurality of scan lines intersecting the data lines to divide the display region into a plurality of pixel regions;
a plurality of selection-line regions, wherein each of the selection-line regions is located at a side of one of the scan lines, and wherein disposed on two sides of each of the scan lines are respectively one of the pixel regions and one of the selection-line regions, and wherein each of the selection-line regions has plural selection lines intersecting the data lines, and at least one of the selection lines of one of the selection-line regions is electrically connected to one of the data lines through a contact, and wherein the data lines are located in one layer different from another layer in which the selection lines are located;

a first welding point at an intersection position of one of the selection lines of another selection-line region and the data line on which the contact is located, and in electrical contact with the data line and the selection line where the intersection position is; and a repair line between the signal-sending region and the display region, wherein the repair line intersects the selection lines, and the repair line and the data lines are selectively electrically connected to one of the selection lines of at least one of the selection-line regions.

2. The electronic paper display device of claim 1, wherein an intersection position of the repair line and one of the selection lines of at least one of the selection-line regions has a second welding point.

3. The electronic paper display device of claim 1, wherein at intersection positions of the repair line and the selection lines, the repair line is located above the selection lines.

4. The electronic paper display device of claim 1, wherein at intersection positions of the data lines and the selection lines, the data lines are located above the selection lines.

5. The electronic paper display device of claim 1, wherein the data lines are parallel to the repair line.

6. The electronic paper display device of claim 1, wherein the scan lines are perpendicular to the data lines.

7. The electronic paper display device of claim 1, wherein the scan lines, the selection-line regions, and the data lines surround the pixel regions.

8. The electronic paper display device of claim 1, wherein one of the selection lines of each of the selection-line regions is a grounding line.

9. The electronic paper display device of claim 1, wherein the repair line has a common voltage.

10. The electronic paper display device of claim 1, wherein the scan lines are gate lines.

11. The electronic paper display device of claim 1, wherein the data lines and the repair line are metal lines in the same layer.

12. A manufacturing method of an electronic paper display device, comprising:

(a) providing an electronic paper display device that has a display region, a signal-sending region, a plurality of data lines, and a plurality of scan lines;

(b) forming a plurality of selection-line regions, wherein each of the selection-line regions is located at a side of one of the scan lines, such that disposed on two sides of each of the scan lines are respectively one of the selection-line regions and one of a plurality of pixel regions of the display region, wherein each of the selection-line regions has plural selection lines, and the data lines are in one layer different from another layer in which the selection lines are located, and at least one of the selection lines of one of the selection-line regions is electrically connected to one of the data lines through a contact; and (c) forming a repair line that is between the signal-sending region and the display region and a first welding point that is at an intersection position of one of the selection lines of another selection-line region and the data line on which the contact is located, wherein the first welding point is in electrical contact with the data line and the selection line where the intersection position is, and wherein the repair line intersects the selection lines, and the repair line and the data lines are selectively electrically connected to one of the selection lines of at least one of the selection-line regions.

13. The manufacturing method of the electronic paper display device of claim 12, wherein step (c) comprises:
forming a second welding point at an intersection position of the repair line and one of the selection lines of at least one of the selection-line regions.

14. The manufacturing method of the electronic paper display device of claim 13, comprising:
performing a laser process at the intersection position for forming the second welding point.

15. The manufacturing method of the electronic paper display device of claim 12, comprising:
performing a laser process at the intersection position for forming the first welding point.

* * * * *